United States Patent
Lowenthal et al.

(10) Patent No.: US 12,475,663 B2
(45) Date of Patent: *Nov. 18, 2025

(54) REGISTRATION OF 3D AUGMENTED SCENE TO STRUCTURAL FLOOR PLANS

(71) Applicant: SparX App Ltd., Tel Aviv-Jaffa (IL)

(72) Inventors: Dan Lowenthal, Amikam (IL); Amit Cherniak, Tel Aviv (IL); Nativ Levy, Hod Hasharon (IL); Ehud Li-Hod, Ramat Gan (IL)

(73) Assignee: SparX App Ltd., Tel Aviv-Jaffa (IL)

( * ) Notice: Subject to any disclaimer, the term of this patent is extended or adjusted under 35 U.S.C. 154(b) by 191 days.

This patent is subject to a terminal disclaimer.

(21) Appl. No.: 18/222,505

(22) Filed: Jul. 17, 2023

(65) Prior Publication Data

US 2023/0368482 A1 Nov. 16, 2023

Related U.S. Application Data

(63) Continuation of application No. PCT/IL2022/050066, filed on Jan. 17, 2022, which is
(Continued)

(51) Int. Cl.
*G06T 19/00* (2011.01)
*G06T 7/33* (2017.01)
(Continued)

(52) U.S. Cl.
CPC .............. *G06T 19/20* (2013.01); *G06T 7/33* (2017.01); *G06T 17/00* (2013.01); *G06T 19/006* (2013.01);
(Continued)

(58) Field of Classification Search
CPC .................................................. G06T 19/006
See application file for complete search history.

(56) References Cited

U.S. PATENT DOCUMENTS 10,733,800 B2 * 8/2020 Booth .................... G06T 15/04
2016/0247319 A1 * 8/2016 Nowatzyk ......... G02F 1/133528

FOREIGN PATENT DOCUMENTS

CN 102798362 11/2012
WO WO 2022/153315 7/2022

OTHER PUBLICATIONS

International Search Report and the Written Opinion Dated Mar. 30, 2022 From the International Searching Authority Re. Application No. PCT/IL2021/050066. (6 Pages).
(Continued)

*Primary Examiner* — Martin Mushambo (57) ABSTRACT

Disclosed herein are methods and systems for registering an Augmented Reality (AR) scene to a 3D model of a certain area, comprising accumulating a geometrical dataset of a certain area based on visual data captured by imaging sensors during an AR session, obtaining a 3D model of the certain area, computing a similarity score for the geometrical dataset compared to the 3D model rotated in several candidate principal rotation angles based on parallelism of corresponding planes identified in the geometrical dataset and in the rotated 3D model, selecting a highest score principal rotation angle, computing a translation vector for each of a plurality of fine-tune rotation angles with respect to the selected principal rotation angle based on a distance between the corresponding planes, selecting a lowest distance fine-tune rotation angle, and registering the geometrical dataset to the 3D model according to the selected fine-tune rotation angle and its translation vector.

20 Claims, 5 Drawing Sheets

Related U.S. Application Data a continuation of application No. 17/367,707, filed on Jul. 6, 2021, now Pat. No. 11,315,339.

(60) Provisional application No. 63/138,473, filed on Jan. 17, 2021.

(51) Int. Cl.
  *G06T 17/00* (2006.01)
  *G06T 19/20* (2011.01)
(52) U.S. Cl.
  CPC .......... *G06T 2219/2004* (2013.01); *G06T 2219/2016* (2013.01)

(56) References Cited

OTHER PUBLICATIONS

Notice of Allowance Dated Feb. 23, 2022 from US Patent and Trademark Office Re. U.S. Appl. No. 17/367,707. (6 pages).
Official Action Dated Jan. 5, 2022 from US Patent and Trademark Office Re. U.S. Appl. No. 17/367,707. (7 pages).
International Preliminary Report on Patentability Dated Jul. 27, 2023 From the International Bureau of WIPO Re. Application No. PCT/IL2022/050066 (5 Pages).
Supplementary European Search Report and European Search Opinion Dated Nov. 6, 2024 From the European Patent Office Re. Application No. 22739272.7. (7 Pages).
Bosché "Plane-Based Registration of Construction Laser Scans With 3D/4D Building Models", Advanced Engineering Informatics, XP028339511, 26(1): 90-102, Available Online Oct. 4, 2011.
Golparvar-Fard et al. "Montoring Changes of 3D Building Elements From Unordered Photo Collections", 2011 IEEE International Conference on Computer Vision Workshops, ICCV Workshops, XP032095247, Barcelona, Spain, Nov. 6-13, 2011, p. 249-256, Nov. 6, 2011.
Wang et al. "Research of Fast Point Cloud Registration Method in Construction Error Analysis of Hull Blocks", International Journal of Naval Architecture and Ocean Engineering, XP093091576, 12: 605-616, Jan. 1, 2020.

\* cited by examiner

REGISTRATION OF 3D AUGMENTED SCENE TO STRUCTURAL FLOOR PLANS

RELATED APPLICATIONS

This application is a Continuation of PCT Patent Application No. PCT/IL2022/050066 having International filing date of Jan. 17, 2022, which is a Continuation of U.S. patent application Ser. No. 17/367,707 filed on Jul. 6, 2021, now U.S. Pat. No. 11,315,339 issued on Apr. 26, 2022, which claims the benefit of priority under 35 USC § 119(e) of U.S. Provisional Patent Application No. 63/138,473 filed on Jan. 17, 2021. The contents of the above applications are all incorporated by reference as if fully set forth herein in their entirety.

FIELD AND BACKGROUND OF THE INVENTION

The present invention, in some embodiments thereof, relates to registering a three dimensional (3D) augmented reality scene, and, more specifically, but not exclusively, to registering a 3D augmented reality scene to a structural model of the scene generated based on floor plan(s) of the scene location.

Augmented Reality (AR) in which data, for example, visual data, audio data, tactile data and/or the like may be added, overlaid, layered, superimposed and/or the like over real-world scenes are rapidly evolving in recent times. AR technology, systems and applications are widely spreading and may target various, diverse needs, applications, markets and/or the like, ranging from medical procedures training and practice applications through trading, shopping, gaming and leisure applications to industry/military training applications.

Due to its inherent advantages, the AR technology may be a realistic, efficient and hence highly appealing platform for interacting with human users to present the users with real-world scenes augmented to include additional visual data, either realistic, synthetic and/or a combination thereof, optionally coupled with an audible, tactile and/or other sensory simulation. The interaction may be employed to realistically simulate a plurality of diverse scenes, scenarios, events, situations, cases, conditions and/or the like.

SUMMARY OF THE INVENTION

It is an object of the present invention to provide, methods, systems and software program products for registering an AR scene of a certain area to one or more 3D models of the certain area created based on one or more floor pans of the certain area. The foregoing and other objects are achieved by the features of the independent claims. Further implementation forms are apparent from the dependent claims, the description and the figures.

According to a first aspect of the present invention there is provided a method of registering an augmented reality (AR) scene of a certain area to three dimensional (3D) model of the certain area, comprising using one or more processors configured for:

Accumulating a geometrical dataset of a certain area based on visual data captured by one or more imaging sensors during an active AR session.

Obtaining a 3D model of the certain area.

Computing a similarity score for the geometrical dataset compared to the 3D model rotated in each of a plurality of principal rotation angles. The similarity score is indicative of parallelism of a plurality of corresponding planes identified in the geometrical dataset and in the rotated 3D model.

Selecting a principal rotation angle producing a highest similarity score.

Computing a translation vector for each of a plurality of fine-tune rotation angles with respect to the selected principal rotation angle based on a distance between the corresponding planes.

Selecting a fine-tune rotation angle producing a lowest distance between the corresponding planes.

Registering the geometrical dataset to the 3D model according to the selected fine-tune rotation angle and its respective translation vector.

According to a second aspect of the present invention there is provided a system for registering an augmented reality (AR) scene of a certain area to three dimensional (3D) model of the certain area, comprising one or more processors configured to execute a code, the code comprising:

Code instructions to accumulate a geometrical dataset of a certain area based on visual data captured by one or more imaging sensors during an active AR session.

Code instructions to obtain a 3D model of the certain area.

Code instructions to compute a similarity score for the geometrical dataset compared to the 3D model rotated in each of a plurality of principal rotation angles. The similarity score is indicative of parallelism of a plurality of corresponding planes identified in the geometrical dataset and in the rotated 3D model.

Code instructions to select a principal rotation angle producing a highest similarity score.

Code instructions to compute a translation vector for each of a plurality of fine-tune rotation angles with respect to the selected principal rotation angle based on a distance between the corresponding planes.

Code instructions to select a fine-tune rotation angle producing a lowest distance between the corresponding planes.

Code instructions to register the geometrical dataset to the 3D model according to the selected fine-tune rotation angle and its respective translation vector.

According to a third aspect of the present invention there is provided a computer program product for identifying a matching floor plan for an augmented reality (AR) session, comprising one or more computer readable storage medias having thereon:

First program instructions executable by one or more processors to cause the one or more processors to code instructions to accumulate a geometrical dataset of a certain area based on visual data captured by one or more imaging sensors during an active AR session.

Second program instructions executable by the one or more processors to cause the one or more processors to obtain a 3D model of the certain area.

Third program instructions executable by the one or more processor to cause the one or more processors to compute a similarity score for the geometrical dataset compared to the 3D model rotated in each of a plurality of principal rotation angles. The similarity score is indicative of parallelism of a plurality of corresponding planes identified in the geometrical dataset and in the rotated 3D model.

Fourth program instructions executable by the one or more processors to cause the one or more processors to select a principal rotation angle producing a highest similarity score.

Fifth program instructions executable by the one or more processors to cause the one or more processors to compute a translation vector for each of a plurality of fine-tune rotation angles with respect to the selected principal rotation angle based on a distance between the corresponding planes.

Sixth program instructions executable by the one or more processors to cause the one or more processors to select a fine-tune rotation angle producing a lowest distance between the corresponding planes.

Seventh program instructions executable by the one or more processors to cause the one or more processors to register the geometrical dataset to the 3D model according to the selected fine-tune rotation angle and its respective translation vector.

In an optional implementation form of the first, second and/or third aspects, the registration according to the selected rotation angle and translation vector is failed in case the lowest distance exceeds a certain threshold.

In a further implementation form of the first, second and/or third aspects, the geometrical dataset and each rotated 3D model are first aligned around a positive perpendicular axis of the certain area and a zero floor height prior to computing the similarity score.

In a further implementation form of the first, second and/or third aspects, computing the translation vector for each fine-tune rotation angle comprises:

Applying a sliding window over the geometrical dataset and the 3D model rotated according to the respective fine-tune rotation angle such that the sliding window is located in a plurality of window positions covering the geometrical dataset and the 3D model.

Computing, in each of the plurality of window positions, a distance between each plane identified in the window of the geometrical dataset and in the window of the 3D model.

Computing the translation vector of the respective fine-tune rotation angle by aggregating a plurality of distance values computed for a plurality of corresponding planes identified in the plurality of window positions.

In a further implementation form of the first, second and/or third aspects, aggregating the plurality of distance values to compute the translation vector comprises computing a mean value for the plurality of distance values.

In a further implementation form of the first, second and/or third aspects, the 3D model is created for the certain area based on one or more floor plans of the certain area.

In a further implementation form of the first, second and/or third aspects, each of the plurality of planes is a member of a group consisting of: a wall, a floor, a ceiling, a door and a window.

In a further implementation form of the first, second and/or third aspects, the plurality of principal rotation angles are members of a group consisting of: a first angle aligned with a point of origin of the 3D model, the first angle+pi/2, the first angle+p1 and the first angle+pi*3/2.

In a further implementation form of the first, second and/or third aspects, the distance between corresponding planes identified in the geometrical dataset and the 3D model rotated according to each fine-tune rotation angle is computed based on a dot product of the normal of the respective planes.

In an optional implementation form of the first, second and/or third aspects, the geometrical dataset is registered to the 3D model based on one or more reference planes in 3D model which is identified in the geometrical dataset.

In an optional implementation form of the first, second and/or third aspects, the translation vector is computed for the geometrical dataset with respect to a plurality of 3D models potentially relating to the certain area and selecting one of the plurality of 3D models which produces a lowest distance between the corresponding planes, each of the plurality of 3D models which is created based on a respective floor plan.

In an optional implementation form of the first, second and/or third aspects, the registration of the geometrical dataset with the 3D model is tracked by adjusting the selected fine-tune rotation angle and its respective translation vector to overcome potential drifting due to change in a point of view and/or a location of one or more of the imaging sensors.

In a further implementation form of the first, second and/or third aspects, the registration is adjusted by computing the translation vector based on the distance values computed between a plurality of planes identified in the geometrical dataset and corresponding planes identified in the 3D model where each of the plurality of planes is assigned a respective weight.

In a further implementation form of the first, second and/or third aspects, the weight assigned to each of the plurality of planes is computed based on one or more of:

A distance of the respective plane from one or more of the imaging sensor such that closer planes are assigned higher weights and further planes are assigned lower weights.

A most recent time at which the respective plane was identified such that more recently detected planes are assigned higher weights and less recently detected planes are assigned lower weights.

A position and/or orientation of the respective plane as derived from the geometrical dataset.

In a further implementation form of the first, second and/or third aspects, the registration is adjusted by:

Listing each plane recently updated in the geometrical dataset and its corresponding plane in the 3D model.

Computing the location of the respective plane in the geometrical dataset based on the static location of the corresponding plane in the 3D model.

In an optional implementation form of the first, second and/or third aspects, the 3D model of the certain area is updated based on one or more geometrical features relating to one or more of the plurality of planes extracted from the geometrical dataset.

In an optional implementation form of the first, second and/or third aspects, a realistic 3D model is created by overlaying at least part of the visual data over the 3D model.

In an optional implementation form of the first, second and/or third aspects, the 3D model of the certain area is created based on one or more previous geometrical datasets created during one or more previous AR sessions in the certain area. The one or more previous geometrical datasets are crated based on visual data captured by one or more AR devices during the one or more previous AR sessions.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to registering a 3D augmented reality scene, and, more specifically, but not exclusively, to registering a 3D augmented reality scene to a structural model of the scene generated based on floor plan(s) of the scene location.

According to some embodiments of the present invention, there are provided methods, systems and computer program products for registering a 3D Augmented Reality (AR) scene of a certain area with a 3D structural model of the certain area during an active AR session by registering a geometrical dataset of the certain area to with a 3D structural model of the certain area where the geometrical dataset is created and gradually accumulated based on visual data captured during the AR session.

An Augmented Reality (AR) device, for example, stereoscopic goggles, a 3D Helmet Mounted Display (HMD), a smartphone, a tablet, a laptop and/or the like carried by a user may be used during an AR session in a certain area, for example, a room, an apartment, a house, a building, an office, a store, a mall and practically any indoor and/or outdoor architectural structure to generate an AR scene based on the visual scene of the certain area.

In particular, the AR scene in which one or more virtual elements, for example, an object, a symbol, an icon, text and/or the like may be presented (displayed) to the user via the AR device thus augmenting the real world scene captured by one or more imaging sensors, for example, a camera, a video camera, a panoramic imaging sensor, a 360 imaging sensor array and/or the like integrated, mounted, attached and/or otherwise coupled to the AR device.

However, in order to create a reliable and/or consistent AR session, the added virtual elements should be accurately placed and located in the real world scene of the certain area which may require accurately registering the AR scene to the real world scene.

To this end, a geometrical dataset may be created and accumulated for the certain area based on the visual data captured by the imaging sensor(s) while the user carrying the AR device moves in the certain area such that the visual data may depict the certain area and/or part thereof from a plurality of locations within the certain area, from one or more viewpoints, from one or more view angles and/or the like. The geometrical dataset may include a geometrical representation (e.g. location, position, orientation, dimension, etc.) of one or more elements and/or objects identified in the certain, in particular structural elements identified in the certain area, for example, a wall, a floor, a ceiling, a door, a window and/or the like. The geometrical dataset may further position, locate and/or place each of the planes with respect to a coordinate system applied for the certain location, for example, Cartesian coordinate system and/or the like.

The geometrical dataset may be then registered to a 3D structural model(s) available for the certain area expressing a reference geometric dataset comprising geometrical features of the certain area which may be available in one or more formats as known in the art, for example, SparX format and/or the like. The 3D model may be created based on one or more floor plans of the cretin area, for example, a drawing, a design, an outline and/or the like. In particular, the floor plan(s) may include drawings to scale from one or more viewpoints of the certain area. Moreover, a plurality of 3D models which may potentially relate to the certain area each created based on respective floor plan(s) may be obtained in attempt to register the geometrical dataset accumulated in the certain area to one of them. However, for brevity a single 3D model is discussed herein after.

Specifically, the geometrical dataset accumulated in the certain area during the active AR session may be registered to the 3D model of the certain area in two steps (phases). First, a principal rotation angle may be identified in which the geometrical dataset best matches the 3D model. In the second phase, a fine-tune rotation angle which is offset from the selected principal rotation angle (with respect to) may be identified in which the geometrical dataset best matches the 3D model and selected for registering the AR scene to the 3D model accordingly.

In the first phase, the geometrical dataset may be compared to the 3D model while rotated in each of a plurality of (candidate) principal rotation angles, for example, a first angle aligned with a point of origin of the 3D model, the first angle+pi/2, the first angle+p1 and/or the first angle+pi*3/2. Specifically, after aligning the geometrical dataset and the 3D model rotated in each of the principal rotation angles to share a common coordinate system and origin point, a similarity score may be computed for the geometrical dataset compared to each rotated 3D model. The similarity score computed based on distances between the corresponding planes in the geometrical dataset and the rotated 3D model is indicative of parallelism of a plurality of planes identified in the geometrical dataset and corresponding planes identified in the rotated 3D model.

A principal rotation angle producing the highest similarity score may be selected as a starting point for the second phase of the registration in which the rotation of the 3D model is fine-tuned. In this phase the geometrical dataset may be compared to the 3D model rotated in each of a plurality of (candidate) fine-tune rotation angles with respect to the selected principal rotation angle, i.e. the fine-tune rotation angles are shifter and/or incremented starting from the selected principal rotation angle.

A translation vector may be computed for each of the plurality of fine-tune rotation angles such that the translation vector which may be based on a transform matrix expressing translation, rotation, scale and/or the like may map each of the planes identified in the geometrical dataset to a respective plane in the fine-tuned rotated 3D model.

The translation vector may be computed based on a tabular (table) search through the geometrical dataset and the 3D model rotated in each fine-tune rotation angle to best fit corresponding planes identified in the geometrical dataset and in each rotated 3D model. The table search may be based, for example, on a grid applied over the geometrical dataset and the rotated 3D model using a sliding window covering only a limited and typically small section of the geometrical dataset and the rotated 3D model. The sliding window may be moved over the geometrical dataset and the rotated 3D model such that the sliding window is located in a plurality of window positions covering the geometrical dataset and the respective rotated 3D model. In each of the window positions, a distance may be computed between each plane identified in the geometrical dataset and a corresponding plane in the rotated 3D model. The distance values computed in the plurality of window positions may be then aggregated, for example, averaged (mean value) to compute the translation vector of the respective fine-tune rotation angle.

Moreover, for each fine-tune rotation angle, an aggregated distance value may be computed between the planes identified in the geometrical dataset and corresponding planes in the fine-tuned rotated 3D model and the fine-tune rotation angles producing lowest distance may be selected.

The geometrical dataset to the 3D model may be then registered with the 3D model rotated according to the selected fine-tune rotation angle using the translation vector computed for the selected fine-tune rotation angle.

Optionally, in case the registration is determined insufficient, for example, the lowest aggregated distance value among the plurality of fine-tune rotation angles exceeds a certain threshold value, the registration fails.

After the geometrical dataset is successfully registered to the 3D model of the certain area, the 3D model may be used during the AR session for one or more of a plurality of applications. For example, a location, a position, an orientation, one or more dimensions and/or the like of one or more of the structural elements of the geographical area as expressed in the 3D model may be used during the AR session to present (display) one or more visual objects, elements, symbols, icons, text and/or the like in the AR scene augmenting the real-world scene of the certain area. For example, the AR session may be directed to an interior design application in which one or more objects, for example, furniture (e.g. a table, a chair, a sofa, a carpet, etc.), appliances (e.g. kitchen appliances, television, etc.) may be simulated in the AR scene of the certain location, in particular, while the certain area is empty in reality. In another example, the AR session may be directed to a gaming application in which one or more gaming objects, elements, symbols, icons, text and/or the like may be presented in the AR scene.

According to some embodiments of the present invention, the registration between the geometrical dataset accumulated during the AR session in the certain area and the 3D model may be tracked and dynamically adjusted to maintain high reliability registration and overcome potential drifting between the geometrical dataset and the 3D model which may result from changes to the viewpoint and/or location of the imaging sensors in the certain area.

The dynamic registration adjustment is based on recounting and/or adjusting the translation vector mapping the geometrical dataset to the 3D model based on weights assigned to planes identified in the geometrical dataset. As such, higher weights may be assigned to planes estimated to have positive contribution to the registration (e.g. closer planes, more recently detected planes, etc.) while lower weights may be assigned to planes estimated to have reduced and/or negative contribution to the registration (e.g. further away closer planes, less recently detected planes, etc.). Optionally, the 3D model of the certain area may be adjusted, updated and/or modified according to geometrical data extracted from the geometrical dataset accumulated for the certain area during the AR session. Moreover, one or more images captured in the certain area by the imaging sensor(s) of the AR device during the AR session may be used to enrich the 3D model of the certain area, for example, overlay the image(s) on the 3D model to create a visual, realistic 3D model of the certain area.

According to some embodiments of the present invention, the 3D model of the certain area may be created based on one or more geometrical datasets accumulated during one or more previous AR sessions in the certain area. This means that rather than creating the 3D model based on floor plan(s) of the certain area, the 3D model may be created based on real-world data extracted from one or more geometrical datasets created and accumulated by one or more AR devices in one or more AR sessions and used for registering the geometrical dataset captured during one or more future AR session in the certain area.

Registering an AR scene augmenting the scene of a certain area to the 3D model of the certain area using the two-phased registration approach may present significant benefits and advantages compared to existing methods and systems for registering AR scenes.

First, as AR technology becomes more common and widely used, a plurality of applications may take advantage of AR advantages and capabilities, specifically after registering the AR scene to the actual physical area and location as documented in accurate engineering and architectural datasets and models. Virtual symbols, objects, elements, text and/or the like may be then accurately added to augment the real-world scene and create a highly accurate, reliable and/or consistent AR scene base on the real-world architectural models expressing accurate position, location, orientation and/or dimensions of the structural elements of the real-world area. The increased accuracy AR scene may thus enable, support and introduce new AR functionalities, increased reliability and more which may significantly improve user experience. For example, home design applications, accommodation offering applications and/or the like may enable simulation and visualization of furniture, appliances, decoration and/or the like during AR sessions in one or more areas, for example, apartments, houses, offices, stores and/or the like while empty of such objects.

Moreover, applying the two-phased registration approach in which the principal rotation angle is first selected from only four candidates may reduce the registration problem which is essentially a multi-dimensional problem having multiple freedom degrees to four cases each with only two degrees of freedom thus significantly reducing complexity of the problem. Reducing the dimensionality of the registration problem may significantly reduce computing resources, for example, processing resources, storage resources, processing time and/or the like. Reducing the required computing resources may allow the use of low-end AR devices having limited computing resources to create and maintain high quality AR sessions which are accurately, and reliably registered to respective 3D models. Furthermore, reducing the registration time may enable real-time accurately registered AR sessions which may further improve the user experience of users during the AR sessions.

Furthermore, tracking the AR scene and dynamically adjusting the registration of the AR scene to the 3D model accordingly may resolve drifting effects which may result from movement of AR device which may maintain the accuracy of the additional visual data added in the AR scene thus further improving the user experience.

In addition, the AR session may often break due to one or more reasons, for example, the AR application may be closed or suspended while the AR device (carried by the user) changes location and/or viewpoint thus the tracking and registration is broken and lost, the imaging sensor(s) may be blocked and stop capturing visual data, reflection of the scene or part thereof in a mirror and/or the like. Applying the two-phased registration may allow for easy, quick and robust recovery of the AR session in such AR break scenarios.

Also, updating the 3D model of the certain area according to the geometrical data and/or features extracted from the geometrical dataset during may significantly increase accuracy, reliability and/or integrity of the 3D model which may improve the registration process and/or the user experience during future AR session in the certain area. Moreover, creating the visual, realistic 3D model of the certain area using the image(s) captured during the AR session may further increase the realistic appearance of the 3D model which may further improve the registration process and/or the user experience during future AR session in the certain area.

Creating the 3D model of the certain area based on visual data captured during previous AR session(s), specifically based the geometrical dataset(s) accumulated during the previous AR session(s) may enable accurate registration of the AR scene during subsequent AR session(s) with no need for floor plans of the certain area. This may be highly beneficial for applications where the floor plans of certain areas are unavailable. For example, one or more accommodation offering applications (e.g. Airbnb, booking, etc.) configured to support AR sessions and/or virtual tours in a plurality of areas, for example, apartments, houses, offices and/or the like may not have access to the floor plans of these areas. However, using the 3D models created based on the previously accumulated geometrical dataset(s) may enable accurately registering the AR scenes to respective 3D models to improve the user experience with no need for the actual floor plans of these areas. Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
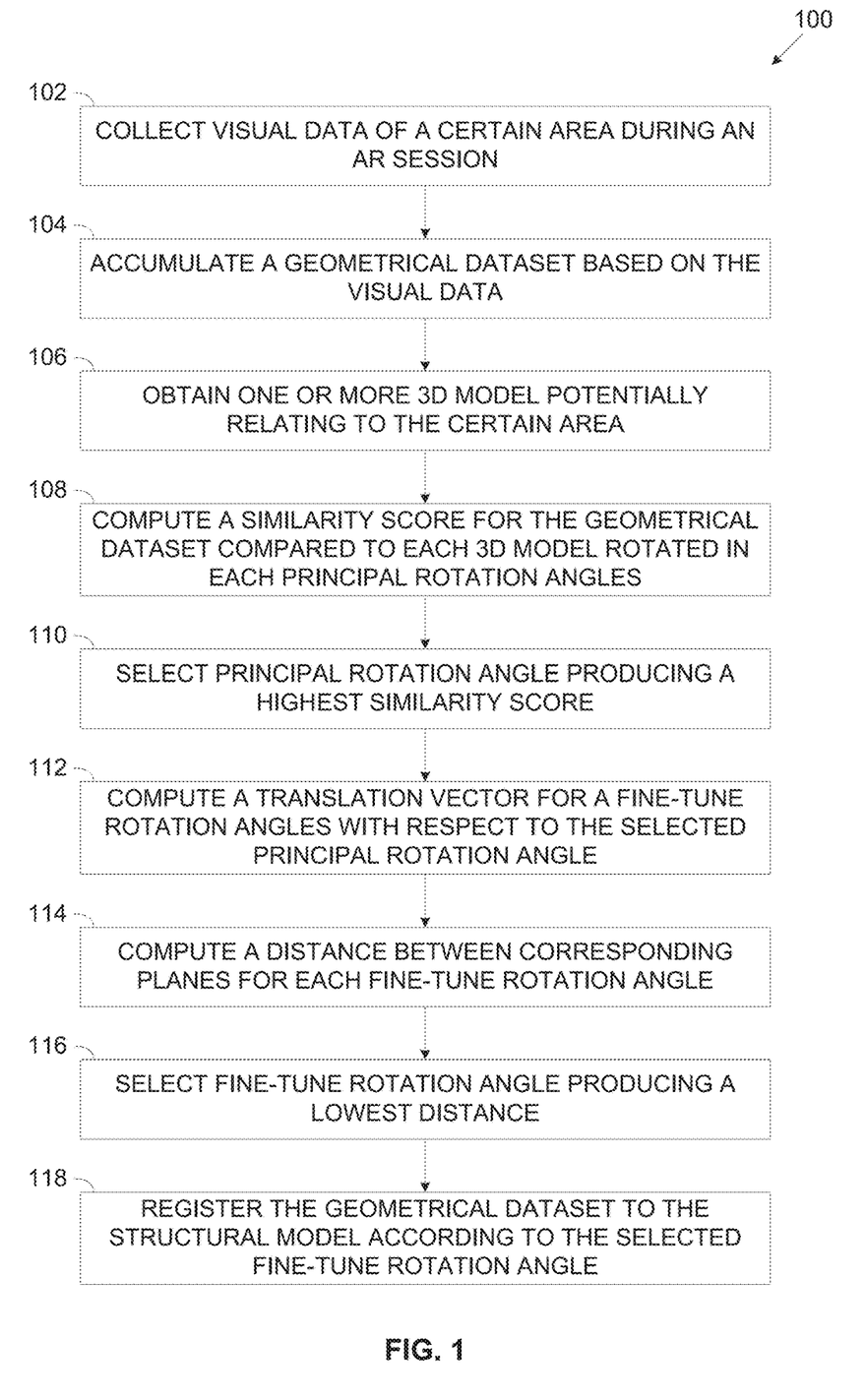
FIG. 1 is a flowchart of an exemplary process of registering a 3D augmented reality scene of a certain area to a structural model of the certain area, according to some embodiments of the present invention.

Referring now to the drawings, FIG. 1 is a flowchart of an exemplary process of registering a 3D augmented reality scene of a certain area to a structural model of the certain area, according to some embodiments of the present invention.

A process 100 may be executed to register a 3D Augmented Reality (AR) scene of a certain area with a structural model of the certain area during an AR session by registering a geometrical dataset of the certain area gradually accumulated and created based on visual data captured during the AR session with the structural model.

Specifically, the registration which is essentially a multi-dimensional problem having multiple freedom degrees may be reduced to four cases each with only two degrees of freedom thus significantly reducing complexity of the problem.

Reducing the dimensionality of the registration problem of the AR scene to the 3D structural model may significantly reduce computing resources and/or registration time while maintaining a highly accurate, consistent and reliable registration.

Figure 2:
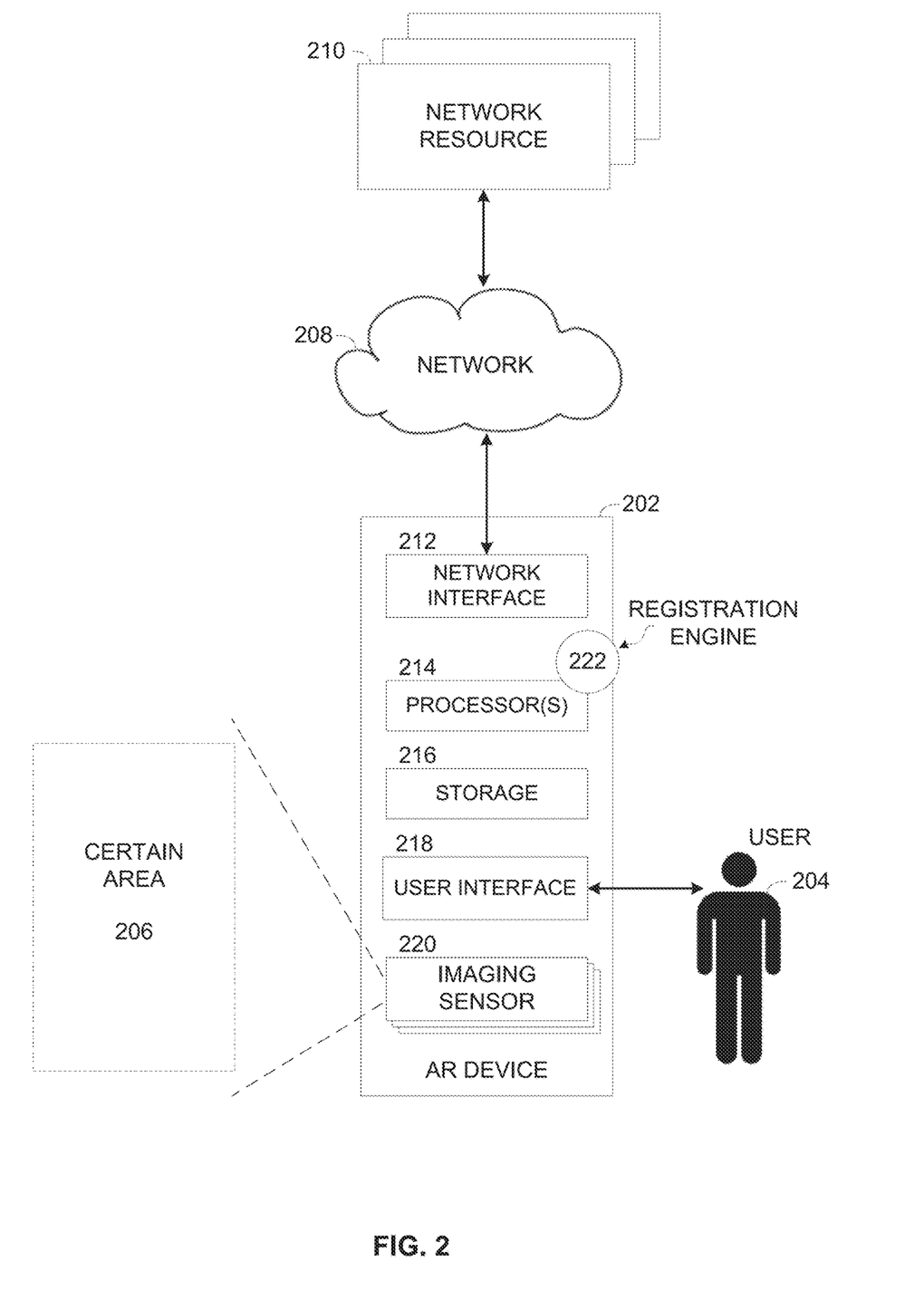
FIG. 2 is a schematic illustration of an exemplary system for registering a 3D augmented reality scene of a certain area to a structural model of the certain area, according to some embodiments of the present invention.

Reference is also made to FIG. 2, which is a schematic illustration of an exemplary system for registering a 3D augmented reality scene of a certain area to a structural model of the certain area, according to some embodiments of the present invention.

An AR client device 202, in particular a mobile AR device may be used by a user 204 during an AR session to generate an augmented reality environment over a scene of a certain area 206 which may practically include any location but may typically relate to indoor locations. The certain area 206 may thus include, for example, a room, an apartment, a house, a building, an office, a store, a mall and practically any indoor and/or outdoor architectural structure.

The AR device 202, for example, stereoscopic goggles, 3D HMD, smartphone, tablet, laptop and/or the like may include, a network interface 212, a processor(s) 214, a storage 216, a user interface 218 and on or more imaging sensors 220.

The network interface 212 may include one or more wired and/or wireless interfaces for connecting to a network 208 comprising one or more wired and/or wireless networks, for example, a Local Area Network (LAN), a Wide Area Network (WAN), a Metropolitan Area Network (MAN), a Wireless LAN (WLAN), a cellular network, and/or the internet to facilitate communication with more or more remote network resources 210, for example, a server, a storage server, a database, a cloud service and/or platform and/or the like.

The processor(s) 214, homogenous or heterogeneous, may include one or more processors arranged for parallel processing, as clusters and/or as one or more multi core processors. The storage 216 may include one or more non-transitory persistent storage devices, for example, a Read Only Memory (ROM), a Flash array, a Solid State Drive (SSD), a hard drive (HDD) and/or the like. The storage 216 may also include one or more volatile devices, for example, a Random Access Memory (RAM) component, a cache and/or the like.

The user interface 218 may include one or more Human-Machine Interfaces (HMI) for interacting with the user 204. In particular, the user interface 218 may comprise a display, a screen, a projector, a touchscreen and/or the like for presenting the AR scene to the user 204. However, the user interface 218 may typically further include one or more additional HMI interfaces for further interaction, input and/or output, with the user 204, for example, a keyboard, a touchpad, a pointing device, a digital pen, a speaker, an earphone, a microphone and/or the like.

The imaging sensor(s) 220, for example, a camera, a video camera, a panoramic imaging sensor, a 360 imaging sensor array and/or the like configured to capture visual data of the certain area 206, for example, one or more images, in particular image sequence(s), video stream(s) and/or the like may be communicatively coupled to the AR device 202, specifically to the processor(s) 214.

The imaging sensor(s) 220 may be mechanically coupled to the AR device 202 using one or more methods, implementations and/or deployments, for example, integrated, mount, attached and/or the like. The imaging sensor(s) 220 may therefore communicate with the processor(s) 214 via one or more communication channels, interfaces and/or networks which may be internal in the AR device 202 and/or external depending on the deployment of the imaging sensor(s) 220.

The processor(s) 214 may execute one or more software modules such as, for example, a process, a script, an application, an agent, a utility, a tool, an Operating System (OS) and/or the like each comprising a plurality of program instructions stored in a non-transitory medium (program store) such as the storage 216 and executed by one or more processors such as the processor(s) 214. The processor(s) 214 may optionally integrate, utilize and/or facilitate one or more hardware elements (modules) integrated, utilized and/or otherwise available in the AR device 202, for example, a circuit, a component, an Integrated Circuit (IC), an Application Specific Integrated Circuit (ASIC), a Field Programmable Gate Array (FPGA), a Digital Signals Processor (DSP), a Graphical Processing Unit (GPU) and/or the like.

The processor(s) 214 may therefore execute one or more functional modules implemented using one or more software modules, one or more of the hardware modules and/or combination thereof, for example, a registration engine 222 for executing the process 100.

As shown at 102, the process 100 may start with the registration engine 222 receiving visual data of the certain area 206 captured by one or more of the imaging sensors 220 of the AR device 202 during an active AR session.

The user 204 using, holding wearing and/or otherwise carrying the AR device 202 may move through the area 206 while the imaging sensor(s) 220 capture visual data of the certain area 206 in one or more capturing modes, for example, continuously, periodically and/or on command.

The registration engine 222 may therefore collect and accumulate visual data captured while the user 204 carrying the AR device 202 is moving in the certain area such that the visual data may depict the certain area and/or part thereof from a plurality of locations within the certain area 206, from a plurality of viewpoints, view angles and/or the like.

As shown at 104, based on the collected and accumulated visual data, the registration engine 222 may create, accumulate and update a geometrical dataset of the certain area 206.

The geometrical dataset may include a geometrical representation of one or more elements and/or objects identified in the certain 206, in particular structural elements of the certain area 206, for example, a wall, a floor, a ceiling, a door, a window and/or the like.

The accumulated geometrical dataset may therefore include and/or describe one or more planes representing each of the structural elements identified in the certain area 206 during the AR session. Specifically, the geometrical dataset may include and/or describe one or more dimensions of each of the planes, for example, a length, a width, a height, a depth and/or the like. The geometrical dataset may further position, locate and/or place each of the planes with respect to a coordinate system applied for the certain location 206, for example, Cartesian coordinate system and/or the like.

As shown at 106, the registration engine 222 may obtain one or more 3D models which may potentially relate to the certain area 206. Each of the 3D models may express a reference geometric dataset of a respective area and may comprise geometrical features of the respective area that may potentially relate to the certain area. The 3D models may be available in one or more formats as known in the art, for example, SparX format and/or the like.

Each of the 3D models may be created based on one or more floor plans of a respective area, for example, a drawing, a design, an outline and/or the like. In particular, each floor plan may be drawings to scale from a top view, a side view, a bottom view and/or the like of the respective area. The 3D model of a respective area may therefore include a representation, specifically a geometrical representation each structural element of the respective area which as described herein before, may include, for example, a wall, a floor, a ceiling, a door, a window and/or the like.

In some embodiments, in case the certain area 206 may be conclusively identified, the registration engine 222 may obtain a single 3D model of the certain area 206 created based on one or more floor plans of the certain area 206. For example, assuming the registration engine 222 is capable to determine and/or identify the exact geographical location, for example, address, coordinates and/or the like of the certain area 206. For example, assuming the certain area 206 is a house located on a certain street, the registration engine 222 may obtain the 3D model associate with the certain house. In another example, assuming the certain area is a store in a certain mall which may be identified by a store number, identifier and/or the like. In such case, assuming the registration engine 222 has access to one or more 3D models of stores in the certain mall, the registration engine 222 may obtain the 3D model associate with the certain house.

The registration engine 222 may identify the certain area 206 using one or more method and/or techniques and/or implementations. For example, the user 204 may interact with the registration engine 222 via the user interface 218 to provide an identifier of the certain area 206, for example, its geographical location. In another example, the registration engine 222 may communicate with one or more geolocation sensors of the AR device 202, for example, a Global Positioning System (GPS) sensor to obtain the current geographical location (geolocation reading) of the AR device 202 and identity the certain area 206 accordingly. In another example, the registration engine 222 may communicate with one or more sensors of the AR device 202, for example, one of the imaging sensors 220 to receive one or more images that may be analyzed to identify the certain area 206. For example, based on analysis of the image(s), the registration engine 222 may identify a street address sign, plate and/or the like and may identity the certain area 206 accordingly.

However, in other embodiments, specifically when the certain area 206 may not be decisively identified, the registration engine 222 may obtain a plurality of 3D model of a plurality of areas which may potentially match and/or relate to the certain area 206. Each of the plurality of 3D model may be created based on one or more floor plans of a respective one of a plurality of different areas such as the certain area 206.

Figure 3:
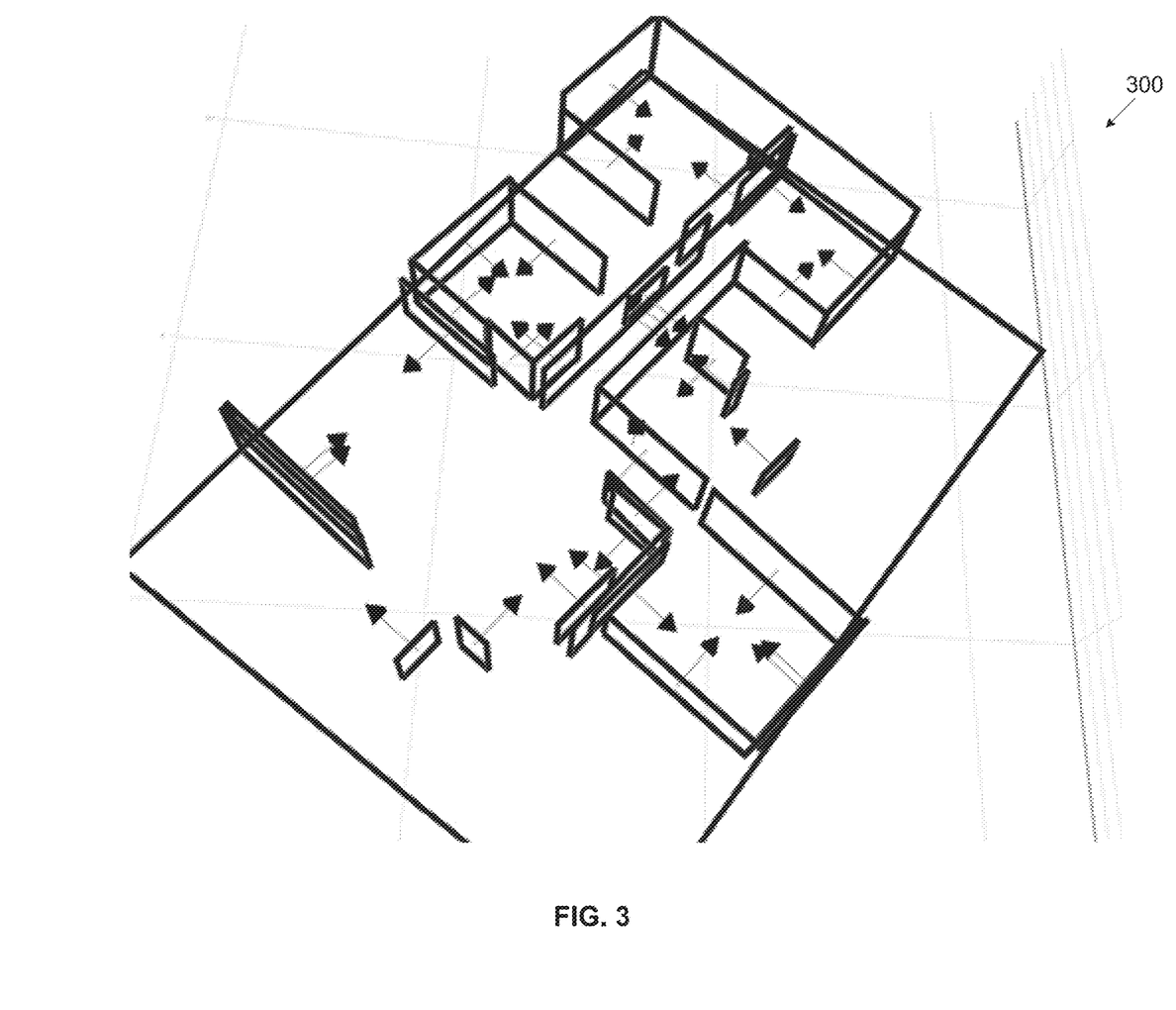
FIG. 3 is a schematic illustration of an exemplary 3D structural model created for a certain area based on one or more floor plans of the certain area, according to some embodiments of the present invention.

FIG. 3 is a schematic illustration of an exemplary 3D structural model created for a certain area based on one or more floor plans of the certain area, according to some embodiments of the present invention. A 3D (structural) model 300 of a certain area such as the certain area 206 may be created based on one or more floor plans of the certain area 206, for example, one or more drawings to scale of the certain area 206 from one or more views, for example, a top view, a side view, a bottom view and/or the like.

Reference is made once again to FIG. 1.

As shown at 108, the registration engine 222 may compute a similarity score for the geometrical dataset compared to the 3D model rotated in each of a plurality of (candidate) principal rotation angles. The similarity score is indicative of parallelism of a plurality of corresponding planes identified in the geometrical dataset and in the rotated 3D model where, as described herein before the planes may relate to one or more of the structural elements identified in the geometrical dataset and in the 3D model rotated in the respective principal rotation angle.

For brevity step 108 is described for a single 3D model of the certain area 206. This however, should not be construed as limiting since the same process may be extended to compute the similarity score for each of the plurality of 3D models each rotated in each of the principal rotation angles.

The plurality of principal rotation angles may include, for example, a first angle aligned with a point of origin of the 3D model of the certain area 206, the first angle+pi/2, the first angle+pi and/or the first angle+pi*3/2. The point of origin of the 3D model of the certain area 206 may be defined as known in the art, for example, an origin of a coordinate system and/or the like.

The registration engine 222 may first align the geometrical dataset and the rotated 3D model to a common orientation around a common coordinate system, for example, Cartesian coordinate system. For example, the registration engine 222 may align the geometrical dataset and the rotated 3D model around a right handed, positive perpendicular axis (Y axis) of the certain area 206 and a zero floor height where the Y axis is aligned with the gravity axis.

Specifically, the registration engine 222 may align the accumulated geometrical dataset to the coordinate system of the rotated 3D model using orientation data captured and/or measured by one or more inertial sensors associated, coupled, integrated and/or attached to the AR device 202. The orientation data may indicate, for example, a pitch, roll and yaw attitude angles of the AR device 202 which may be indicative of the orientation of the geometrical dataset since the positioning of the imaging sensor(s) 220 with respect to the AR device 202 is predefined and known.

After the geometrical dataset is aligned with the 3D model rotated in each of the principal rotation angles the registration engine 222 may compute the similarity score for the geometrical dataset with respect to the 3D model rotated in the respective principal rotation angle to evaluate parallelism of corresponding planes relating to one or more of the structural elements identified in the geometrical dataset and in the 3D model rotated in the respective principal rotation angle.

The registration engine 222 may apply one or more methods, algorithms and/or formulations for computing the similarity score. For example, the registration engine 222 may analyze the geometrical dataset and each rotated 3D model to identify one or more planes in the geometrical dataset and their corresponding planes in the rotated 3D model based on their location, position and/or orientation with respect to the common coordinate system. For example, the registration engine 222 may identify corresponding planes by minimizing a distance between identified planes to correlate corresponding planes with each other.

For example, the registration engine 222 may compute a parallel_set_distance value for each plane $p_i$, $i \in N_{GT}$ planes in the geometrical dataset which minimizes a distance function parallel_distance of the respective plane pi with respect to each plane $s_j$, $i \in N_{\theta_j}$ planes in the respective rotated 3D model (j=1, 2, 3, 4 principal rotation angles θ) as expressed in equation 1 below to identify a certain plane s corresponding to the respective plane p with highest probability.

parallel_set_distance=(parallel_distance($p_i,s_i$))      Equation 1:

where:

parallel_distance=1−dot(normal($p$),normal($s$))

The registration engine 222 may aggregate the parallel_distance values computed for all the corresponding planes identified in the geometrical dataset and in the 3D model rotated in the receptive principal rotation angle to produce an aggregated distance value for the respective principal rotation angle θ, for example, according to equation 2 below.

parallel_set_distance(θ)=(parallel_distance($p_i,s_i$,θ))      Equation 2:

The aggregated distance value computed for the geometrical dataset with respect to the 3D model rotated in each of the principal rotation angles $\theta_1$, $\theta_2$, $\theta_3$, $\theta_4$ may therefore express the similarity score of the geometrical dataset with respect to the 3D model rotated in each of the principal rotation angles.

Figure 4:
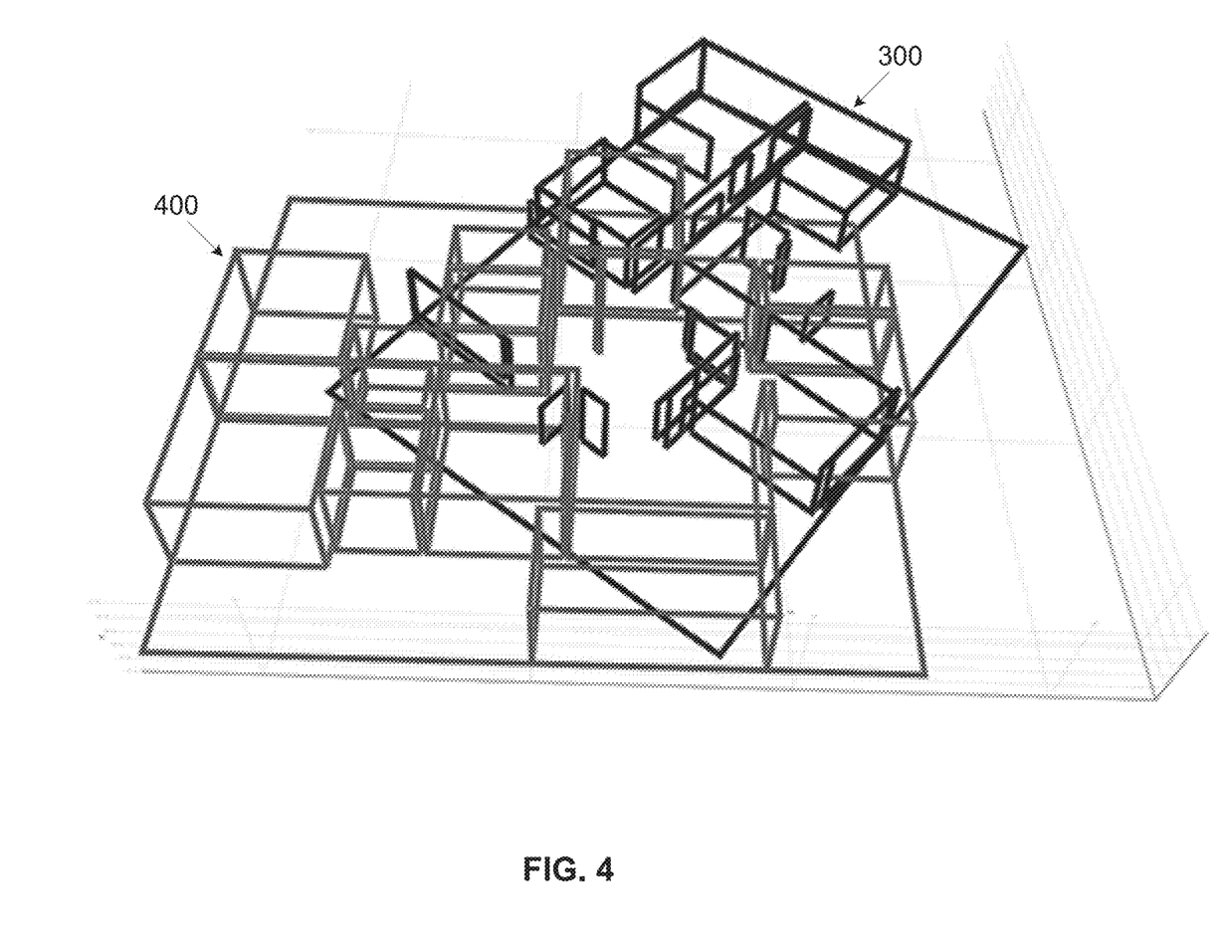
FIG. 4 is a schematic illustration of a registration of an exemplary geometrical dataset created for 3D augmented reality scene of a certain area to a 3D structural model of the certain area rotated in a certain principal rotation angle, according to some embodiments of the present invention.

Reference is now made to FIG. 4, which is a schematic illustration of a registration of an exemplary geometrical dataset created for 3D augmented reality scene of a certain area to a 3D structural model of the certain area rotated in a certain principal rotation angle, according to some embodiments of the present invention.

A 3D model such as the 3D model 300 created for a certain area such as the certain area 206 may be rotated in a plurality of principal rotation angles, for example, a first angle aligned with a point of origin of the 3D model 300, the first angle+pi/2, the first angle+p1 and/or the first angle+pi*3/2 with respect to a geometrical dataset 400 created, accumulated and updated for the certain area 206.

As seen, the geometrical dataset 400 may be aligned to the rotated 3D model 300, for example, around the positive perpendicular gravity axis (Y axis) of the certain area 206 and a zero floor height to establish a common coordinate system origin point.

Reference is made once again to FIG. 1.

As shown at 110, the registration engine 222 may select the principal rotation angle which produces the highest similarity score indicating that the 3D model rotated in the selected principal rotation angle is most similar, for example, in orientation to the geometrical dataset.

As shown at 112, the registration engine 222 may compute a translation vector for each of a plurality of fine-tune rotation angles where in each fine-tune rotation angle the 3D model is further slightly rotated from the selected principal rotation angle. The fine-tune rotation angles may be shifted and/or incremented by a fixed step, for example, one degree, two degrees, three degrees and/or the like.

The translation vector which may be based on a transform matrix expressing translation, rotation, scale and/or the like as known in the art, may map the planes of the geometrical dataset to respective planes in the rotated 3D model.

The registration engine 222 may compute the translation vector by applying a tabular (table) search through the geometrical dataset and the 3D model rotated in each fine-tune rotation angle to best fit the corresponding planes in the geometrical dataset and in the respective rotated 3D model.

For example, the registration engine 222 may generate a grid over the geometrical dataset and the rotated 3D model and may apply a sliding window covering only a limited and typically small size section of the geometrical dataset and the rotated 3D model. The registration engine 222 may move the sliding window over the geometrical dataset and the 3D model rotated according to the respective fine-tune rotation angle such that the sliding window is located in a plurality of window positions covering the geometrical dataset and the respective rotated 3D model.

For each of the plurality of window positions, the registration engine 222 may compute a distance value between each plane identified in the window of the geometrical dataset and in the corresponding window of the respective rotated 3D model. The window size and/or window shift (step) size may be predefined, for example, the size of the sliding window may be set to reflect, for example, 5 meters, 7.5 meters, 10 meters and/or the like in the real world certain area 206 and the sliding windows shift (step) may be set to, for example, 0.5 meters, one meter and/or the like.

After moving the sliding window over the entire gridded geometrical dataset and respective rotated 3D model, the registration engine 222 may compute the translation vector of the respective fine-tune rotation angle by aggregating a plurality of distance values computed for a plurality of corresponding planes identified in the plurality of window positions. The registration engine 222 may apply one or more computations and/or formulations to aggregate the plurality of distance values computed for the plurality of planes, for example, the registration engine 222 may average the plurality of distance values to compute a mean value of the distance values that may be used for the translation vector of the respective fine-tune rotation angle.

Figure 5:
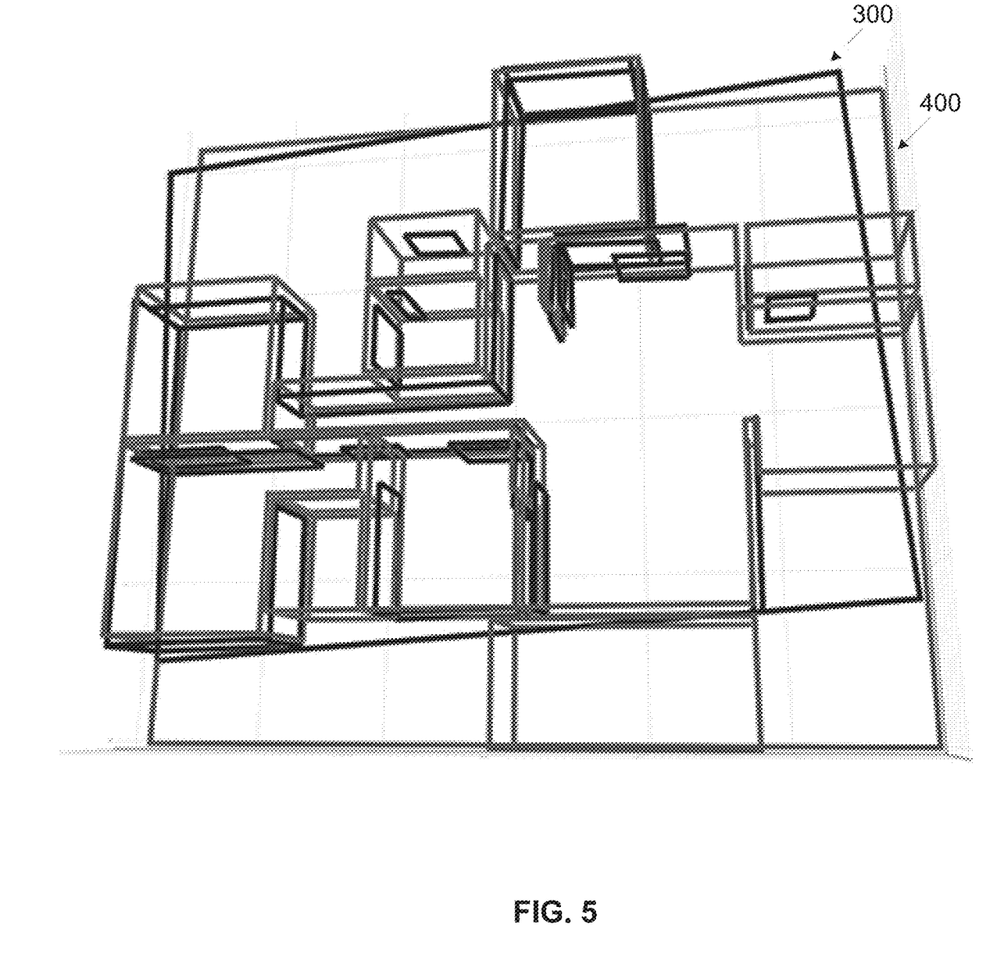
FIG. 5 is a schematic illustration of a registration of an exemplary geometrical dataset created for 3D augmented reality scene of a certain area to a 3D structural model of the certain area rotated in a certain fine-tune rotation angle, according to some embodiments of the present invention.

Reference is now made to FIG. 5, which is a schematic illustration of a registration of an exemplary geometrical dataset created for 3D augmented reality scene of a certain area to a 3D structural model of the certain area rotated in a certain fine-tune rotation angle, according to some embodiments of the present invention.

A 3D model such as the 3D model 300 created for a certain area such as the certain area 206 may be rotated in a plurality of fine-tune rotation angles shifted and/or incremented by a fixed step, for example, one degree, two degrees, three degrees and/or the like with respect to a selected one of the principal rotation angles with respect to a geometrical dataset such as the geometrical dataset 400 created, accumulated and updated for the certain area 206.

Reference is made once again to FIG. 1.

As shown at 114, for each of the plurality of fine-tune rotation angles, the registration engine 222 may compute an aggregated distance value, for example, a mean value between the corresponding planes identified in the geometrical dataset and in the 3D model rotated according to the respective fine-tune rotation angle.

The registration engine 222 may apply one or more methods, techniques and/or formulations to compute the distance values between the corresponding planes, for example, the registration engine 222 may apply the dot product based computation of equation 1 to compute an aggregated (e.g. average, mean) distance value for each fine-tune rotation angle.

As shown at 116, the registration engine 222 may select one of the fine-tune rotation angles which produces a lowest distance between the corresponding planes, in particular a lowest aggregated distance value, for example, a minimal mean (average) value.

As shown at 118, the registration engine 222 may register the geometrical dataset to the 3D model according to the selected fine-tune rotation angle and the respective translation vector computed for the selected fine-tune rotation angle.

Optionally, the registration engine 222 may fail the registration in case it determines that the registration may be inefficient and/or not satisfactory. In particular, the registration engine 222 may fail the registration in case the lowest distance, i.e., the lowest aggregated distance between the geometrical dataset and the 3D model rotated in any of the fine-tune rotation angles exceeds (i.e., larger than) a certain threshold.

The registration engine 222 may further output an indication, for example, a message and/or the like indicating that the registration failed.

After the geometrical dataset is successfully registered to the 3D model of the certain area 206, the 3D model of the certain area 206 may be used during the AR session for one or more of a plurality of applications. In particular, a location, one or more dimensions and/or the like of one or more of the structural elements of the geographical area 206 as expressed and described in the 3D model may be used during the AR session to present (display) one or more objects, elements, symbols, icons, text and/or the like in the AR scene.

For example, the AR session may be directed to an interior design application to simulate and visualize, in the AR scene, one or more objects, for example, furniture (e.g. a table, a chair, a sofa, a carpet, etc.), appliances (e.g. kitchen appliances, television, etc.) in the certain location 206, in particular, while the certain area 206 is empty. In such case, the simulated objects may be presented (displayed) in the AR scene in scale according to a location and/or dimension(s) of one or more of the structural elements of the geographical area 206 as reflected in the 3D model of the certain area 206. In another example, the AR session may be directed to a gaming application in which one or more objects, elements, symbols, text and/or the like may be presented (displayed) in the AR scene according to the dimension(s) and/or location of the structural elements of the 3D model of the certain area 206.

According to some embodiments of the present invention, the registration between the geometrical dataset accumulated during the AR session in the certain area 206 and the 3D model may be tracked and dynamically adjusted to maintain high reliability registration and overcome potential drifting between the geometrical dataset and the 3D model rotated according to the selected fine-tune rotation angle. Specifically, the registration engine 222 may track the registration by adjusting dynamically the fine-tune rotation angle and its respective computed translation vector to compensate for and adjust to the viewpoint change and or movement of the imaging sensor(s) 220.

While the user 204 carrying the AR device 202 travels and moves through the certain area 206, the imaging sensor(s) 220 of the AR device 202 which capture the visual data used to generate the augmented scene may change viewpoint and/or location within the certain area 206 which may lead to a drift between the geometrical dataset and the 3D model rotated according to the selected fine-tune rotation angle. The drifting effects may be increased and emphasized in areas 206 where there are only few noticeable landmarks, specifically planes of structural elements which may be used for registering the geometrical dataset to the 3D model.

The registration engine 222 may therefore apply one or more methods, techniques and/or algorithms for tracking and dynamically adjusting the registration of the geometrical dataset of the certain area 206 to the 3D model of the certain area 206.

In a first exemplary embodiment, the registration engine 222 may track the registration by applying weights to the planes identified in the geometrical dataset. In particular, the registration engine 222 may adjust the distance values computed between the planes in the geometrical dataset and the corresponding planes in the 3D model according to their respective weights in order to compute a new translation vector and/or update the translation vector initially computed for the selected fine-tune rotation angle. The registration engine 222 may apply one or more operation modes to assign weights to the planes identified in the geometrical dataset.

For example, the registration engine 222 may assign weights to the planes identified in the geometrical dataset based on the distance of the planes from the AR device 202, in particular from the imaging sensor(s) 220 capturing the visual data processed to generate the geometrical dataset. Specifically, the registration engine 222 may assign higher weights to planes which are closer to the imaging sensor(s) 220 and lower weights to planes which are located further from the imaging sensor(s) 220. As such closer planes may have a higher contribution to the translation vector compared to further away planes thus enhancing the registration, specifically for the immediate and close proximity environment of the user 204.

In another example, the registration engine 222 may assign weights to the planes identified in the geometrical dataset based on a most recent time when the planes were identified in the geometrical dataset accumulated in the certain area 206 which may translate to the most recent time the planes are detected in the AR scene. Specifically, the registration engine 222 may assign higher weights to planes which are more recently detected (identified) and lower weights to planes which are less recently detected. located further from the imaging sensor(s) 220. As such, the contribution of most updated data, i.e., planes which are more recently identified to the translation vector is increased while the contribution of the older data, i.e., less recently detected planes may have reduced contribution. This means that the less recently planes which may have been identified, for example, in previously visited rooms and/or spaces may have less contribution to the translation vector thus enhancing the registration of the geometrical dataset for the current location of the user 204.

In another example, the registration engine 222 may assign weights to the planes identified in the geometrical dataset based on position and/or orientation of the planes as derived from the geometrical dataset. Specifically, the registration engine 222 may assign higher weights to planes which are currently visible in the AR scene and whose position and/or orientation may be therefore and lower weights to currently invisible planes whose position and/or orientation could not be inferred, or at least accurately inferred. As such, planes whose position and/or orientation is accurately determined may have a higher contribution compared to planes whose position and/or orientation could not be determined.

In another exemplary embodiment, the registration engine 222 may track the registration by listing each plane recently updated in the geometrical dataset and further listing a corresponding plane identified in the 3D model. The registration engine 222 may then compute the location of each listed plane which was detected in the geometrical dataset based on the static location of the corresponding plane in the 3D model and update the and/or recomputed the translation vector to constantly update the registration.

Optionally, the registration engine 222 may extract from the geometrical dataset geometrical data and/or features relating to one or more of the planes detected in the AR scene during the AR session. The 3D model of the certain area 206 may be then adjusted, updated and/or modified according to extracted geometrical data expressing real-world feature(s) of the respective plane(s) thus enhancing the 3D model accuracy, reliability and/or the like.

Optionally, the registration engine 222 may use at least part of the visual data of the certain area 206, for example, one or more images captured by one or more of the imaging sensor(s) 220 during the AR session. The captured image(s) may be used to enrich the 3D model of the certain area, for example, overlay the image(s) on the 3D model to create a visual, realistic 3D model of the certain area presenting real-world visual (imagery) data accurately combined with the geometrical 3D model.

According to some embodiments of the present invention, instead of using floor plan(s), the 3D model of the certain area 206 may be created based on one or more geometrical datasets accumulated during one or more previous AR sessions in the certain area. One or more AR sessions may be conducted in the certain area 206 using one or more AR devices such as the AR device 202 which may capture visual data of the certain area 206. Respective geometrical datasets may be created and accumulated during the AR session(s) based on the captured visual data. Geometrical data and/or geometrical features of one or more of the planes detected in the certain area 206 may be than used to create and/or update the 3D model of the certain area 206. During one or more subsequent AR session in the certain area 206, the AR scene, specifically the geometrical data accumulated during the subsequent AR session(s) may be registered to the 3D model created based on the data captured in the subsequent AR session(s).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term AR device is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of registering an augmented reality (AR) scene of a certain area to three dimensional (3D) model of the certain area, comprising:
    using at least one processor configured for:
        accumulating a geometrical dataset of the certain area based on visual data captured by at least one imaging sensor during an active AR session;
        obtaining at least one 3D model of the certain area;
        rotating the at least one 3D model in each of a plurality of fine-tune rotation angles;
        computing a translation vector for each of the plurality of fine-tune rotation angles based on a distance between a plurality of corresponding planes identified in the geometrical dataset and in the rotated at least one 3D model;
        selecting a fine-tune rotation angle producing a lowest distance between the corresponding planes; and
        registering the geometrical dataset to the at least one 3D model according to the selected fine-tune rotation angle and its respective translation vector.

2. The method of claim 1, wherein the plurality of fine-tune rotation angles are rotated with respect to a principal rotation angle selected from a plurality of principal rotation angles, the selected principal rotation angle produces a highest similarity score among the plurality of principal rotation angles, the similarity score is indicative of parallelism of the plurality of corresponding planes identified in the geometrical dataset and in the rotated at least one 3D model.

3. The method of claim 2, wherein the plurality of principal rotation angles are members of a group consisting of: a first angle aligned with a point of origin of the at least one 3D model, the first angle+pi/2, the first angle+p1 and the first angle +pi*3/2.

4. The method of claim 1, further comprising failing the registration according to the selected fine-tune rotation angle and translation vector in case the lowest distance exceeds a certain threshold.

5. The method of claim 1, wherein the geometrical dataset and the rotated at least one 3D model are first aligned around a positive perpendicular axis of the certain area and a zero floor height prior to computing the similarity score.

6. The method of claim 1, wherein computing the translation vector for each fine-tune rotation angle comprises:
applying a sliding window over the geometrical dataset and the at least one 3D model rotated according to the respective fine-tune rotation angle such that the sliding window is located in a plurality of window positions covering the geometrical dataset and the at least one 3D model,
computing, in each of the plurality of window positions, a distance between each plane identified in the window of the geometrical dataset and in the window of the 3D model,
computing the translation vector of the respective fine-tune rotation angle by aggregating a plurality of distance values computed for a plurality of corresponding planes identified in the plurality of window positions.

7. The method of claim 6, wherein aggregating the plurality of distance values to compute the translation vector comprises computing a mean value for the plurality of distance values.

8. The method of claim 1, wherein the at least one 3D model is created for the certain area based on at least one floor plan of the certain area.

9. The method of claim 1, wherein each of the plurality of planes is a member of a group consisting of: a wall, a floor, a ceiling, a door and a window.

10. The method of claim 1, wherein the distance between corresponding planes identified in the geometrical dataset and the at least one 3D model rotated according to each fine-tune rotation angle is computed based on a dot product of the normal of the respective planes.

11. The method of claim 1, further comprising registering the geometrical dataset to the at least one 3D model based on at least one reference plane in at least one 3D model which is identified in the geometrical dataset.

12. The method of claim 1, further comprising computing a respective translation vector for the geometrical dataset with respect to each of a plurality of 3D models potentially matching the certain area and selecting one of the plurality of 3D models which produces a lowest distance between the corresponding planes, each of the plurality of 3D models is created based on at least one floor plan of a respective area potentially matching the certain area.

13. The method of claim 1, further comprising tracking the registration of the geometrical dataset with the at least one 3D model by adjusting the selected fine-tune rotation angle and its respective translation vector to overcome potential drifting due to change in a point of view and/or a location of the at least one imaging sensor.

14. The method of claim 13, wherein the registration is adjusted by computing the translation vector based on the distance values computed between a plurality of planes identified in the geometrical dataset and corresponding planes identified in the at least one 3D model where each of the plurality of planes is assigned a respective weight.

15. The method of claim 14, wherein the weight assigned to each of the plurality of planes is computed based on at least one of:
a distance of the respective plane from the at least one imaging sensor such that closer planes are assigned higher weights and further planes are assigned lower weights,
a most recent time at which the respective plane was identified such that more recently detected planes are assigned higher weights and less recently detected planes are assigned lower weights, and
a position and/or orientation of the respective plane as derived from the geometrical dataset.

16. The method of claim 13, wherein the registration is adjusted by:
listing each plane recently updated in the geometrical dataset and its corresponding plane in the at least one 3D model, and
computing the location of the respective plane in the geometrical dataset based on the static location of the corresponding plane in the at least one 3D model.

17. The method of claim 1, further comprising at least one of:
updating the at least one 3D model of the certain area based on at least one geometrical feature relating to at least one of the plurality of planes extracted from the geometrical dataset,
creating a realistic 3D model by overlaying at least part of the visual data over the at least one 3D model.

18. The method of claim 1, further comprising creating the at least one 3D model of the certain area based on at least one previous geometrical dataset created during at least one previous AR session in the certain area, the at least one previous geometrical dataset is crated based on visual data captured by at least one AR device during the at least one previous AR session.

19. A system for registering an augmented reality (AR) scene of a certain area to three dimensional (3D) model of the certain area, comprising:
at least one processor configured to execute a code, the code comprising:
code instructions to accumulate a geometrical dataset of the certain area based on visual data captured by at least one imaging sensor during an active AR session;
code instructions to obtain at least one 3D model of the certain area;
code instructions to compute a similarity score for the geometrical dataset compared to the at least one 3D model rotated in each of a plurality of principal rotation angles, the similarity score is indicative of parallelism of a plurality of corresponding planes identified in the geometrical dataset and in the rotated at least one 3D model;
code instructions to rotate the at least one 3D model in each of a plurality of fine-tune rotation angles;
code instructions to compute a translation vector for each of the plurality of fine-tune rotation angles based on a distance between a plurality of corresponding planes identified in the geometrical dataset and in the rotated at least one 3D model;
code instructions to select a fine-tune rotation angle producing a lowest distance between the corresponding planes; and code instructions to register the geometrical dataset to the at least one 3D model according to the selected fine-tune rotation angle and its respective translation vector.

20. A computer program product for identifying a matching floor plan for an augmented reality (AR) session, comprising:
at least one non-transitory computer readable storage media having thereon:
first program instructions executable by at least one processor to cause the at least one processor to code instructions to accumulate a geometrical dataset of a certain area based on visual data captured by at least one imaging sensor during an active AR session;
second program instructions executable by the at least one processor to cause the at least one processor to obtain at least one 3D model of the certain area;
third program instructions executable by the at least one processor to cause the at least one processor to rotate the at least one 3D model in each of a plurality of fine-tune rotation angles;
fourth program instructions executable by the at least one processor to cause the at least one processor to compute a translation vector for each of the plurality of fine-tune rotation angles with respect to a principal rotation angle based on a distance between a plurality of corresponding planes identified in the geometrical dataset and in the rotated at least one 3D model;
fifth program instructions executable by the at least one processor to cause the at least one processor to select a fine-tune rotation angle producing a lowest distance between the corresponding planes; and
sixth program instructions executable by the at least one processor to cause the at least one processor to register the geometrical dataset to the at least one 3D model according to the selected fine-tune rotation angle and its respective translation vector.

* * * * *